Jan. 14, 1964  S. A. SEYMOUR  3,117,681
STOCK FEEDER

Filed Nov. 13, 1962  3 Sheets-Sheet 1

INVENTOR.
SHAUN A. SEYMOUR
BY
Joseph A. Brown
ATTORNEY

Jan. 14, 1964   S. A. SEYMOUR   3,117,681
STOCK FEEDER
Filed Nov. 13, 1962   3 Sheets-Sheet 2
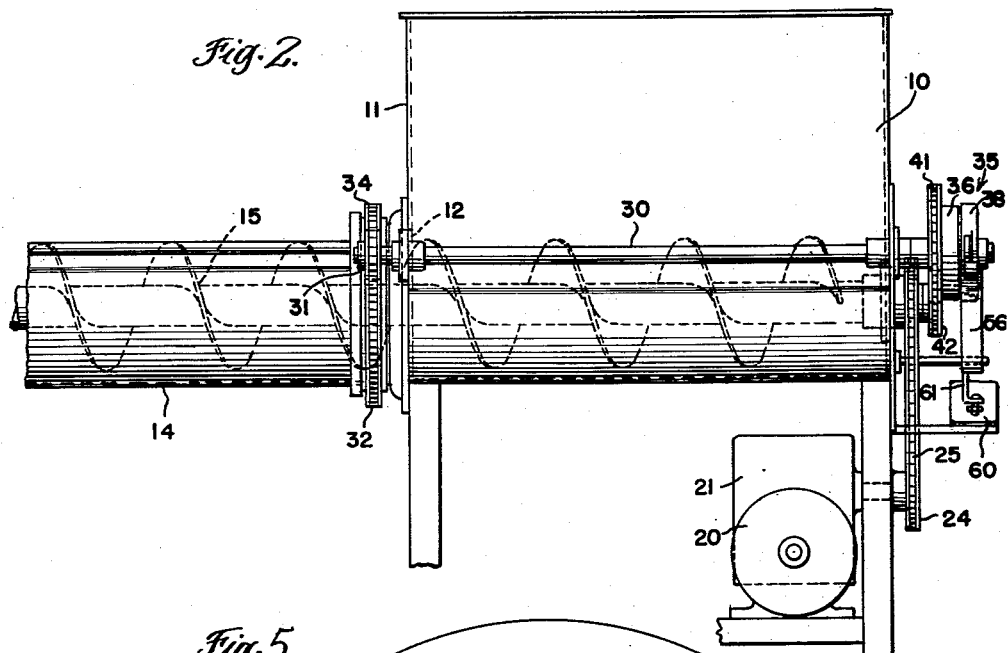
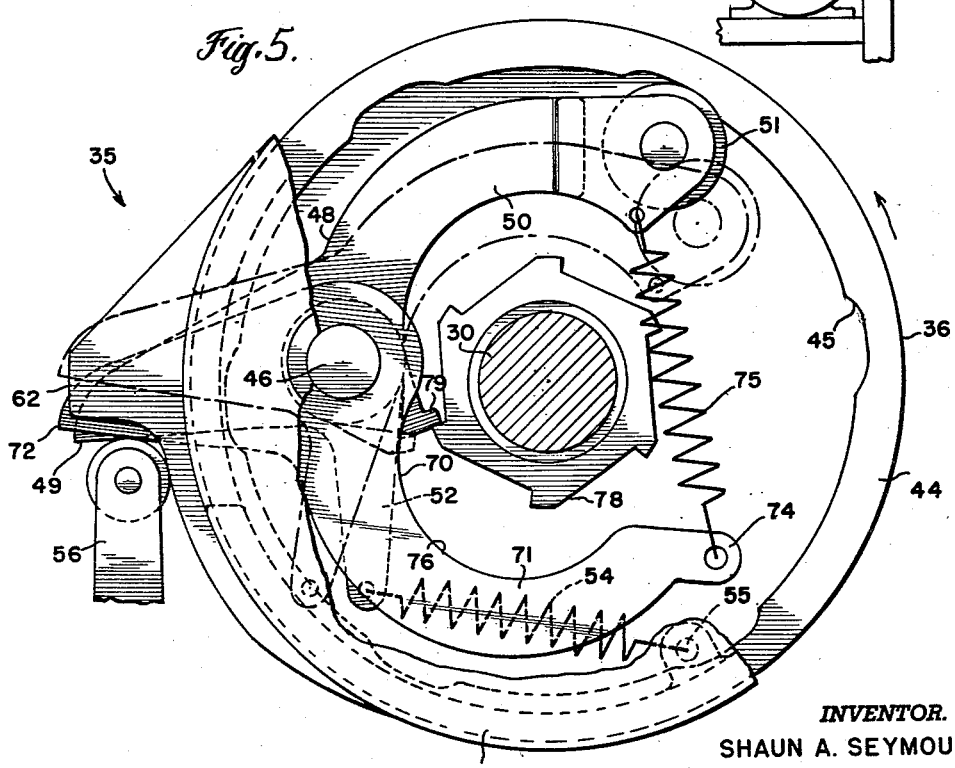
INVENTOR.
SHAUN A. SEYMOUR
BY
*Joseph A. Brown*
ATTORNEY Jan. 14, 1964 S. A. SEYMOUR 3,117,681
STOCK FEEDER
Filed Nov. 13, 1962 3 Sheets-Sheet 3

INVENTOR.
SHAUN A. SEYMOUR
BY
ATTORNEY

United States Patent Office 3,117,681
Patented Jan. 14, 1964

3,117,681
STOCK FEEDER
Shaun A. Seymour, New Holland, Pa., assignor to Sperry Rand Corporation, New Holland, Pa., a corporation of Delaware
Filed Nov. 13, 1962, Ser. No. 236,982
5 Claims. (Cl. 214—17)

This invention relates generally to stock feeders and more particularly to an improved clutch mechanism for a fill-and-dump, rotatable stock feeder.

Heretofore, a stock feeder has been provided having a feed supply hopper located at one end of a horizontally extending elongated rotatable container and communicating therewith. An auger extends throughout the length of the container and into the hopper. Upon rotation, the auger operates to withdraw feed from the hopper and distribute the feed along the length of the container. The container is provided with a rectilinear slot adapted to be located at a twelve o'clock position while the container is receiving feed and moved, by rotation of the container, to a six o'clock position to dump the feed. Successive fill-and-dump operations may be provided until a desired amount of feed has been discharged.

A common power source is used for rotating the auger and the container. However, during a feeding operation the auger rotates continuously and the container only intermittently. A clutch is provided in the drive which when engaged rotates a shaft which drives a chain to rotate the container. For simplicity, a pair of drive and driven clutch members are provided and coaxialy mounted on a drive shaft. A dog is provided on the driven member and movable in a radial direction for engagement with a drive element on the drive member, a trip arm being employed to control the operation of the clutch dog. The dog is carried on a pawl, spring biased towards clutched position. The pawl is held fully disengaged only so long as the pawl is in engagement with the trip arm and when the driven member is in proper angular position.

Problems have resulted in the clutch if the driven member is in improper angular position when the clutch is supposed to be disengaged. The first problem is one of inertia and friction whereby when the driven member of the clutch is disconnected from the drive member, retarding forces tend to immediately stop its rotation and before it reaches its proper stopped position. Also, the driven member sometimes reaches its proper stopped position but retrogressively rotates therefrom because of shaft windup and torque forces in the feed container developing during a dumping operation when the container is rotatably driven. Regardless of the cause, when the driven member is in improper angular position, the spring biased pawl on the driven member is then allowed to pivot from its proper position and its dog may have partial engagement with the drive member. Such improper engagement causes a rapping of the clutch dog with the drive member resulting in noise and undesirable wear of the parts.

A main object of this invention is to provide a clutch, in a stock feeder of the character described, having means for insuring proper operation of a clutch pawl when the clutch is disengaged by a clutch trip arm and regardless of whether a driven member of the clutch is in proper or improper angular position when stopped.

Another object of this invention is to provide a clutch of the character described having spring means actuated by the trip arm for yieldably retaining the clutch pawl in proper retracted position when the clutch is disengaged.

Another object of this invention is to provide in a stock feeder, a clutch having a pair of springs which are successively operable, one to hold the clutch pawl retracted and after release by the trip arm permitting the second spring to move the pawl to engaged position.

A further object of this invention is to provide a clutch structure of the character described which is compact and having operative components which are enclosed to thereby protect them from dust, dirt and the like.

A still further object of this invention is to achieve the foregoing objects with a structure which is simply designed and low in cost.

Other objects of this invention will be apparent hereinafter from the specification and from the recital in the appended claims.

In the drawings:

FIG. 2 is a side elevational view of FIG. 1 on a reduced scale and showing in particular the drive connection from the drive motor to the rotatable feed container of the apparatus;

FIG. 5 is a view similar to FIG. 3 and showing the trip arm in position to actuate the clutch pawl and thereby disengage the clutch, the fixed stop on the driven clutch member being shown just before it engages the trip arm.

Figure 1:
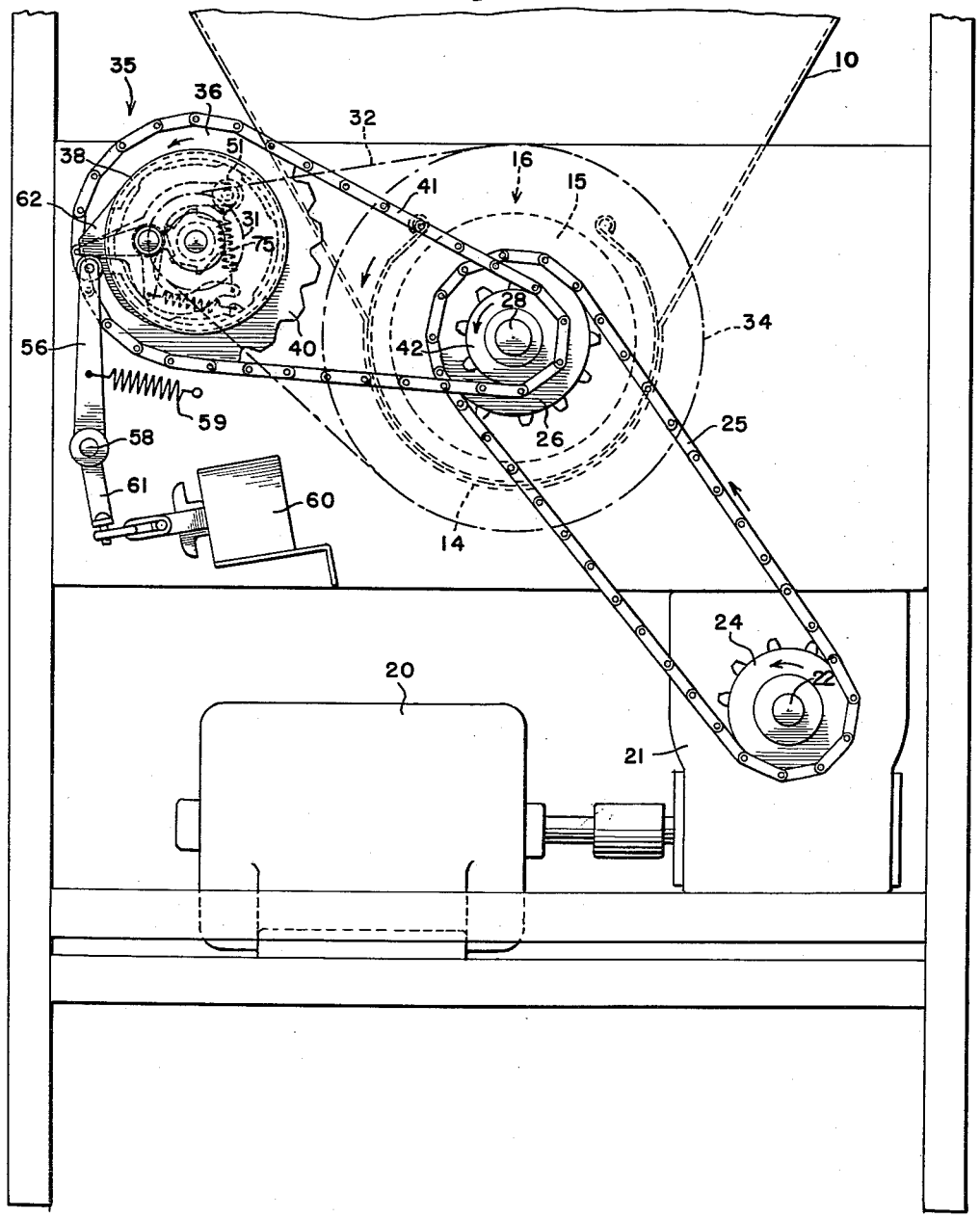
FIG. 1 is an end elevational view looking from the left of FIG. 2 and showing a stock feeder having a clutch constructed according to this invention, the container of the feeder being shown with its slot in an upper, fill position and the clutch being shown disengaged.

Referring now to the drawings by numerals of reference, and first to FIGS. 1 and 2, 10 denotes a hopper adapted to receive a supply of feed. Hopper 10 has a side wall 11 provided with a discharge opening 12 in a lower portion thereof. Communicating with such opening is a semi-cylindrical, horizontally extending container 14. An auger 15 extends throughout the length of the container and into the bottom of the hopper 10 through opening 12. When the auger 15 is rotated, it operates to withdraw material from hopper 10 and to convey and distribute the material throughout the length of container 14.

As shown best in FIG. 1, container 14 has a rectilinear slot 16 which is adapted to be located in a twelve o'clock position when feed is being conveyed and distributed throughout the container 14. The container is suitably supported by means not shown for rotation about its longitudinal axis so that slot 16 can be moved toward and past a six o'clock position to discharge the material from the container. With such structure, container 14 is filled and dumped in successive operations and this may be repeated until a desired amount of feed has been withdrawn from the hopper 10 and distributed.

Auger 15 and container 14 are both rotated from a motor 20. Motor 20 transmits power to a gearbox 21 having an output shaft 22 which rotates a sprocket 24 in a counterclockwise direction when viewed as shown in FIG. 1. Sprocket 24 transmits motion to a drive chain 25 which extends around a sprocket 26 fixed to the shaft 28 of auger 15. Thus, there is a direct and continuous drive from the motor 20 to auger 15.

Figure 4:
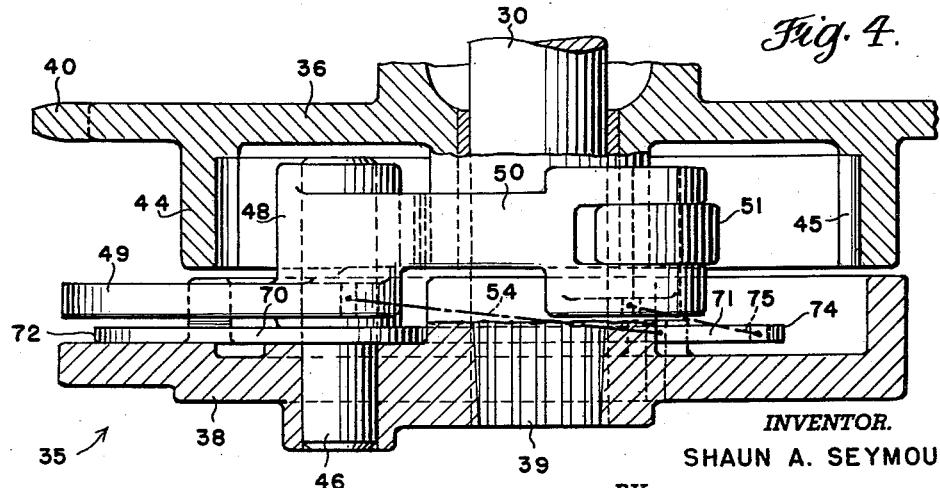
FIG. 4 is a section taken on the line 4—4 of FIG. 3 looking in the direction of the arrows.

While auger 15 is adapted to be continuously rotated during a feeding operation, container 14 rotates only intermittently, that is, when the container has been filled and it is desired to dump the feed therefrom. For rotating the container 14, a shaft 30 is provided which extends parallel to the container and to the auger. Shaft 30 is suitably journalled outside of hopper 10. At the container end of shaft 30, a sprocket 31 is provided around which a chain 32 extends. Chain 32 is trained around a large diameter sprocket 34 suitably fixedly connected to container 14 so that when the sprocket 34 rotates container 14 rotates with it. At the opposite end of the shaft 30, a clutch 35 is provided and constructed according to this invention. The clutch includes a drive member 36 freely rotatably mounted on shaft 30 and a driven member 38 splined onto the end of shaft 30 as shown at 39 in FIG. 4.

Drive member 36 of the clutch has radially projecting teeth 40 which form a sprocket over which chain 41 extends. Chain 41 also passes around a sprocket 42 (FIG. 1) integral with shaft 28 and therefore continuously rotated with auger 15. The drive member 36 has an axially extending collar 44 having angularly spaced, internal drive elements or pockets 45. Driven clutch member 38 carries a pivot pin 46 eccentric to shaft 30 and parallel thereto. Pin 46 supports a pawl 48 having a radially outwardly extending control arm 49 and an arcuate drive arm 50. At its terminal end, drive arm 50 carries a roller 51 which constitutes a dog engageable with the drive elements 45 of the driven clutch member 36. When pawl 48 is pivoted in a clockwise direction, dog 51 is moved radially inwardly and out of driving engagement with clutch member 36. When it is pivoted in the opposite or counterclockwise direction, the dog 51 is moved into driving engagement with one of the elements 45. Pawl 48 has an arm 52 to which a spring 54 is connected. Spring 54 is a tension spring which is connected at 55 to driven member 38 and it biases pawl 48 to pivot in a counterclockwise direction whereby dog 51 is continually urged toward a position wherein it is in driving engagement with one of the drive elements 45 on the drive clutch member 36. For operating pawl 48 and controlling the engagement and disengagement of clutch 35, a trip arm 56 is provided and pivotally supported at 58 (FIG. 1) on hopper 10. A spring 59 interconnected between the hopper structure and the trip arm pulls the trip arm toward a position wherein the arm engages control arm 49 of pawl 48 and holds the clutch disengaged. As long as the trip arm 56 is in the position shown in FIG. 1, pawl 48 is held against the pulling force of spring 54 and dog 51 is held in a radially retracted disengaged position whereby drive element 36 of the clutch is able to rotate freely on the shaft 30 and driven element 36 is held at rest.

For triggering the clutch, a solenoid 60 is provided and controlled by means, not shown. When energized, solenoid 60 pulls one end of a lever 61 to thereby pivot trip arm 56 to the position hown in FIG. 3 and move it radially away from the clutch elements. When so moved, spring 54 is able to become effective to pivot pawl 48 and move dog 51 into driving engagement with one of the elements 45 of driven clutch member 36. Power is then transmitted to shaft 30 which operates through sprocket 31, chain 32 and sprocket 34 to rotate container 14. As shaft 30 rotates, pawl 48 travels with it. When solenoid 60 is de-energized, trip arm 56 is moved back to starting position by spring 59. Control arm 49 of the pawl comes into engagement with trip arm 56 causing the pawl to be pivoted and dog 51 disengaged. Driven member 38 has an outwardly projecting fixed stop 62 which engages trip arm 56 subsequent to declutching of the drive, to dispose the driven member in proper angular position for the next operation of the clutch.

If the rotation of driven member 38 stops before stop 62 engages the trip arm or if the stop engages the trip arm and then member 38 retrogressively rotates a slight distance because of torque forces in container 14 and windup in the shaft 30, then the driven member will assume an improper at-rest position. When the driven member is angularly out of position, spring 54 is able to pivot pawl 48, and dog 51 may have partial engagement only with the drive member 36. Rapping and wear of the parts will result. To overcome a situation wherein the driven member is improperly angularly located, the clutch is provided with a lever 70 in the form of a bell crank and pivotally supported on pin 46. Lever 70 has an arcuate arm 71 and an outwardly projecting control leg 72. The terminal end 74 of lever 70 is connected by a tension spring 75 to the drive arm 50 of pawl 48. Spring 75 is substantially the same size and strength as spring 54. Since spring 75 is interconnected between the pawl drive arm and lever arm 71, it constitutes a floating spring whose pivotal connections move upon actuation of the clutch. Lever arm 71 has a curved inner portion 76 engageable with a toothed element 78 to limit pivotal movement of lever 70 in one direction. Element 78 is (FIG. 3) connected to shaft 30 and with which a tooth 79 of the pawl 48 is engageable to prevent overrunning of the container 14 when it is rotated. Overrunning tends to result because of the engagement of the auger flights with the inner surface of the container and transmission of such forces back through the drive shaft 30.

Figure 3:
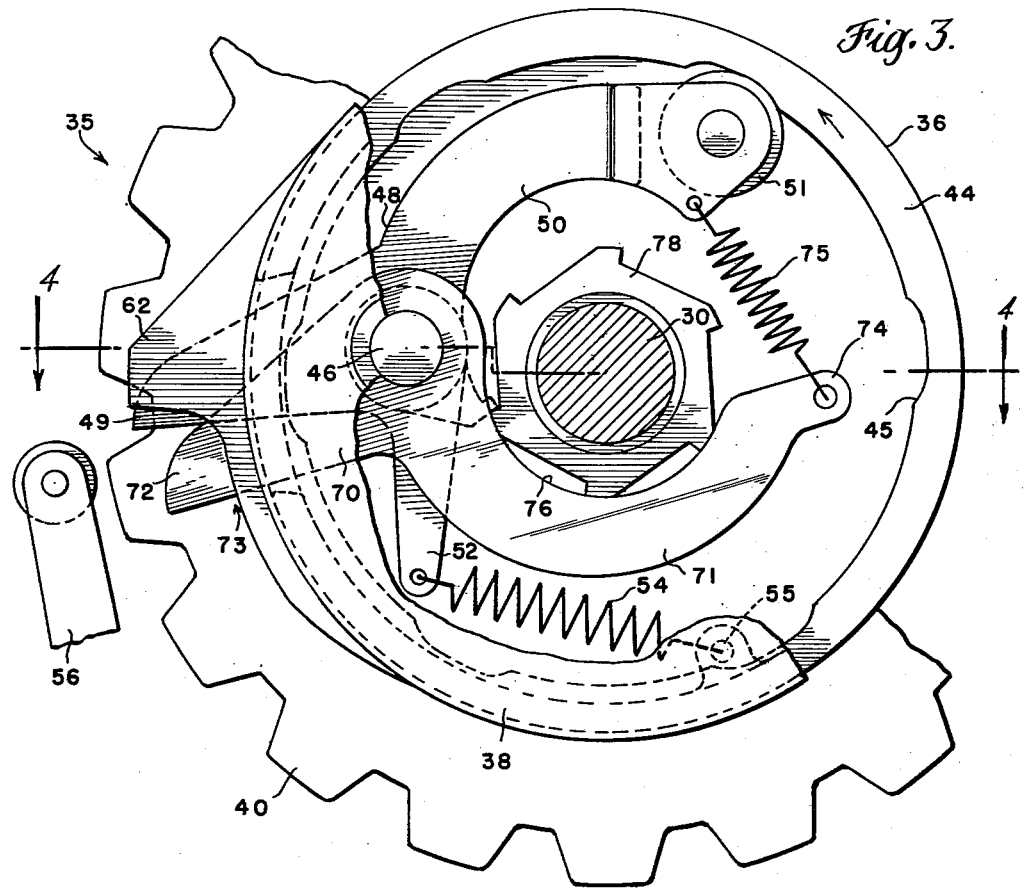
FIG. 3 is an enlarged view of the clutch, portions of the parts being broken away and showing the clutch trip arm in released position and the clutch dog in driving position.

As shown in FIG. 3, when the clutch is in driving engagement, the end 72 of lever 70 is substantially in front of the outwardly projecting control arm 49 of pawl 48 relative to the direction of rotation of the clutch members. Thus, when the trip arm is moved to a position to stop the clutch, it first engages arm 72 causing lever 70 to pivot about pin 46 and to extend spring 75 as shown in FIG. 5. In such view, the parts are shown just before disengagement of the clutch. With the parts so located, there is a substantial force provided by spring 75 tending to pull driving dog 51 out of engagement with drive member 36. After the pivoting of lever 70, pawl control arm 49 is engaged, causing the pawl to pivot and thereby disengage the clutch. After the first pivoting of the pawl to release dog 51 from the particular drive element 45 which it is engaging, spring 75 is able to become effective and apply a strong pulling force to fully retract the pawl. When extended, the tension applied by spring 75 is greater than the force provided by the spring 54, whereby spring 75 assists trip arm 56 in holding the pawl retracted. If the driven member 38 stops before it reaches the trip arm or if there is some retrogressive rotation of shaft 30, spring 75 will insure that the dog 51 will not be unintentionally engaged.

On the next operation of the clutch, when the trip arm 56 releases lever leg 72 and pawl control arm 49, spring 75 pivots lever 70 and the retracting tension on drive arm 50 is released. Spring 54 then becomes effective and pivots the pawl to driving position.

Floating spring 75 actuated by lever 70 insures proper retraction of pawl 48 if stop 62 is spaced from trip arm 56 when the clutch is at-rest. Nevertheless, the arrangement of the parts releases spring 75 when the clutch is tripped so that spring 54 is able to become effective. The operative clutch components are located within drive member 36 and driven member 38. Thus, they are protected from dust, dirt and other material which might foul the clutch.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:
1. In a stock feeder, an elongated horizontally extending rotatable container having a longitudinal slot, an auger rotatable in said container, said auger having flights engageable with said container and being operable to convey and distribute feed along the length thereof when said slot is in an upper position, said feed being discharged on rotation of said container and movement of said slot to a lower position, a rotatable drive shaft, means connecting said shaft to said container to rotate the container, and improved clutch means to intermittently rotate said shaft, said clutch means comprising a drive member freely rotatably supported on said shaft and having at least one drive element thereon, means rotating said drive member in a given direction, a driven member affixed to said shaft and coaxial to said drive member, a pawl supported on said driven member for pivotal movement about an axis parallel to the shaft axis and eccentric thereto, said pawl having a control arm and a drive arm, said control arm projecting radially outwardly of said driven member, said drive arm having a dog movable in a radial direction and being engageable with said drive element on said drive member when the pawl is pivoted in one direction, a first tension spring interconnected between said pawl and said driven member and normally pivoting said pawl in said one direction to a position wherein said drive arm dog is in driving engagement with said drive element on said drive member, a lever pivotally supported on said drive member and having an arm and a control leg, a second tension spring interconnected between said lever arm and said pawl drive arm, the control leg of the lever projecting radially outwardly of said drive member and in a position normally in front of said pawl control arm relative to said direction of rotation of said drive member, a trip arm movable into and out of the paths of travel of said pawl control arm and said lever control leg, said trip arm when moved into said paths first engaging said control leg whereby said lever is pivoted and said second spring is placed under load urging said pawl drive arm dog toward disengagement with said drive member, said trip arm then pivoting said pawl to disengage the drive arm dog from the drive member and move the drive arm radially inwardly, said second spring exerting a force on said pawl drive arm sufficient to hold the drive arm out of engagement with said drive member until said trip arm moves out of engagement with said lever and pawl, whereupon said first tension spring is free to pivot the pawl and move said drive arm dog into driving engagement with said drive member.

2. In a stock feeder as recited in claim 1 wherein said pawl and said lever are pivotally supported on the same pin, for swinging movement about a common axis.

3. In a stock feeder as recited in claim 1 wherein said first and second tension springs are of substantially the same size and strength.

4. In a stock feeder, an elongated horizontally extending rotatable container having a longitudinal slot, an auger rotatable in said container, said auger having flights engageable with said container and being operable to convey and distribute feed along the length thereof when said slot is in an upper position, said feed being discharged on rotation of said container and movement of said slot to a lower position, a rotatable drive shaft, means connecting said shaft to said container to rotate the container, and improved clutch means to intermittently rotate said shaft, said clutch means comprising a drive member freely rotatably supported on said shaft and having at least one drive element thereon, means rotating said drive member in a given direction, a driven member affixed to said shatf and coaxial to said drive member, a pawl supported on said driven member for pivotal movement about an axis parallel to the shaft axis and eccentric thereto, said pawl having a control arm and a drive arm, said control arm projecting radially outwardly of said driven member, said drive arm having a dog movable in a radial direction and being engageable with said drive element on said drive member when the pawl is pivoted in one direction, a first tension spring interconnected between said pawl and said driven member and normally pivoting said pawl in said one direction to a position wherein said drive arm dog is in driving engagement with said drive element on said drive member, a trip arm engageable with said pawl control arm to hold the pawl pivoted in a direction opposite to said one direction to a position wherein the drive arm dog is disengaged from said drive member, means for moving said trip arm out of engagement with said pawl control arm, spring means supported on said driven member and connected to said drive arm to urge said pawl toward proper retracted position, and lever means connected to said spring means and engageable with said trip prior to engagement of the trip arm with said pawl control arm to load said spring means, said spring means being released on disengagement of said trip arm with the pawl control arm whereupon said tension spring is free to pivot the pawl in said one direction.

5. In a stock feeder, an elongated horizontally extending rotatable container having a longitudinal slot, an auger rotatable in said container, said auger having flights engageable with said container and being operable to convey and distribute feed along the length thereof when said slot is in an upper position, said feed being discharged on rotation of said container and movement of said slot to a lower position, a rotatable drive shaft, means connecting said shaft to said container to rotate the container, and improved clutch means to intermittently rotate said shaft, said clutch means comprising a drive member rotatably supported on said shaft and having at least one drive element thereon, means rotating said drive member in a given direction, a driven member affixed to said shaft and coaxial to said drive member, a pawl supported on said driven member for pivotal movement about an axis parallel to the shaft axis and eccentric thereto, said pawl having a control arm and a drive arm, said control arm projecting radially outwardly of said driven member, said drive arm having a dog movable in a radial direction and being engageable with said drive element on said drive member when the pawl is pivoted in one direction, a first tension spring interconnected between said pawl and said driven member and normally pivoting said pawl in said one direction to a position wherein said drive arm dog is in driving engagement with said drive element on said drive member, a trip arm engageable with said pawl control arm to hold the pawl pivoted in a direction opposite to said one direction to a position wherein the drive arm dog is disengaged from said drive member, means for moving said trip arm out of engagement with said pawl control arm, and spring means operatively associated with said pawl and actuated by said trip arm to yieldably hold the pawl pivoted in said opposite direction until the trip arm is disengaged from the pawl control arm whereupon said first tension spring is free to pivot the pawl in said one direction.

References Cited in the file of this patent
UNITED STATES PATENTS
2,940,639   Winter  ---------------  June 14, 1960